(12) United States Patent
Onda et al.

(10) Patent No.: US 6,746,333 B1
(45) Date of Patent: Jun. 8, 2004

(54) GAME SYSTEM, GAME MACHINE AND GAME DATA DISTRIBUTION DEVICE, TOGETHER WITH COMPUTER-USABLE INFORMATION FOR ACCESSING ASSOCIATED DATA OF A GAME OVER A NETWORK

(75) Inventors: Koh Onda, Tokyo (JP); Manabu Sugiyama, Tokyo (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/508,717

(22) PCT Filed: Jul. 22, 1999

(86) PCT No.: PCT/JP99/03928

§ 371 (c)(1),
(2), (4) Date: Apr. 25, 2000

(30) Foreign Application Priority Data

Jul. 22, 1998 (JP) .......................... 10-222267

(51) Int. Cl.[7] .................................. A63F 9/22
(52) U.S. Cl. ................................ 463/43; 463/42
(58) Field of Search .................... 463/1, 26–31, 463/40–43; 705/1, 14, 26; 434/219, 322; 273/429, 454

(56) References Cited

U.S. PATENT DOCUMENTS

| | | | | |
|---|---|---|---|---|
| 5,267,734 A | * | 12/1993 | Stamper et al. ............ | 273/434 |
| 5,547,202 A | | 8/1996 | Tsumura | |
| 5,779,549 A | * | 7/1998 | Walker et al. ................ | 463/42 |
| 5,791,991 A | * | 8/1998 | Small .......................... | 463/41 |
| 5,816,918 A | * | 10/1998 | Kelly et al. .................. | 463/16 |
| 5,851,149 A | * | 12/1998 | Xidos et al. ................. | 463/42 |
| 6,009,411 A | * | 12/1999 | Kepecs ........................ | 705/14 |
| 6,061,656 A | * | 5/2000 | Pace ............................. | 705/1 |
| 6,070,147 A | * | 5/2000 | Harms et al. ................ | 705/14 |
| 6,074,299 A | * | 6/2000 | Cohen ......................... | 463/42 |
| 6,102,406 A | * | 8/2000 | Miles et al. ................ | 273/430 |
| 6,183,362 B1 | * | 2/2001 | Boushy ....................... | 463/25 |
| 6,200,216 B1 | * | 3/2001 | Peppel .......................... | 463/1 |

FOREIGN PATENT DOCUMENTS

| | | |
|---|---|---|
| JP | 6-44160 | 2/1994 |
| JP | 7-59947 | 3/1995 |
| JP | 9-167091 | 6/1997 |
| JP | 10-254968 | 9/1998 |

OTHER PUBLICATIONS

The Definitive Source Guide to Secret Keys, Easter Eggs and Hidden Messages, 1st Ed., Apr. 15, 1992, <http://www.grin.net-/~cturley/USA2WUG/Founding.Members/Home.Pages/Sam/GSGSKEEHM.html> downloaded from the Internet on Jun. 22, 2003.*

$1 Million Prize to' Sirus Game Solver', Promo, vol. VIII, n 10, p. 147.*

Mortal Kombat Tour Maximizes Cross Marketing Opportunities, Amusement Business, vol. 107, n 11, p. 5.*

* cited by examiner

Primary Examiner—Mark Sager
Assistant Examiner—Steven Ashburn
(74) Attorney, Agent, or Firm—Oliff & Berridge, PLC

(57) ABSTRACT

The objective is to provide a game system that satisfies the collecting passions game players and increases their degree of satisfaction in the game.

The invention provides a game system that makes it possible for a player to access data which relates to a game and is on a game data distribution device 200, and obtain this associated data by inputting to a computer terminal 400 access-specific data that was obtained from a game machine 100 when a predetermined game condition was satisfied.

12 Claims, 7 Drawing Sheets

GAME SYSTEM, GAME MACHINE AND GAME DATA DISTRIBUTION DEVICE, TOGETHER WITH COMPUTER-USABLE INFORMATION FOR ACCESSING ASSOCIATED DATA OF A GAME OVER A NETWORK

TECHNICAL FIELD

This invention relates to a game system, a game machine, and a game data distribution device, together with an information storage medium.

BACKGROUND ART

Game data such as samples of game images is generally distributed, either by CD-ROMs attached to magazines or the like or by appearing on Internet Web sites.

However, if the setup is such that anyone can get hold of these sample images, a game player will have a low feeling of satisfaction at obtaining the sample images, which will not satisfy the collecting passions of the game player.

In addition, special game data other than sample images is often distributed to only a few specific game players. Since ordinary game players cannot obtain the special game data in such a case, this is not fair.

There is also a desire on the game provider's part, to supply game players with image data created during the development of a game, which is not displayed in the actual game, or data that enables game players to obtain a deeper understanding of the game, in a fair manner, so that the game players can enjoy the game more.

This invention was devised in the light of the above described problems and has as an objective thereof the provision of a game system, game machine and game data distribution device, and information storage medium which can satisfy the collecting passions of game players and add inducement to a game.

DISCLOSURE OF THE INVENTION (1) A game system in accordance with this invention comprises a game machine and a game data distribution device for distributing associated data of a game to a computer terminal over a network,
  wherein the game machine comprises:
    means for determining whether or not an operational result of a game player has satisfied a predetermined game condition; and
    means for communicating to the game player access-specific data for accessing the associated data of the game, when the game condition has been satisfied;
  wherein the game condition comprises at least one of a selection condition such that it is necessary for the game player to make a predetermined selection and a result condition such that it is necessary to achieve a predetermined result, together with a time-period condition such that the time at which the game is played must be within a predetermined time-period; and
  wherein the game data distribution device comprises:
    storage means for storing the associated data of the game; and
    means for determining whether or not the access-specific data satisfies a predetermined distribution condition, when the access-specific data has been received from the computer terminal, and fetching the associated data of the game from the storage means when the distribution condition has been satisfied, for distribution to the computer terminal.

This aspect of the invention makes it possible for a game player, who is playing a game at this game machine, to obtain associated data of the game by satisfying a predetermined game condition. This enables the game player to experience a feeling of achievement by satisfying a predetermined game condition, and also deepens the player's understanding of the game played at that game machine, by obtaining associated data.

By determinations that include a time-period condition as a game condition, this game system also gives the game player incentive to play the game on the same game machine continuously, making it possible to increase the usage frequency of the game machine.

Note that the distribution condition of the game data distribution device could comprise a distribution-specific time-period condition. This distribution-specific time-period condition could be made to be identical with a time-period condition of the game condition.

In this case, the access-specific data corresponds to verification data such as password data or location data indicating the location of associated data of the game, by way of example.

(2) In this game system, the associated data may comprise collectable data which is not related to the execution of the game, but which is related to any of the game story, objects that appear in the game, characters that appear in the game, game images, and game sounds.

In this case, the collectable data corresponds to design image data for game characters, icons depicting game characters, or sound data relating to the game, by way of example.

This aspect of the invention makes it possible to satisfy the game player's passion for collecting. From the game provider's side, the collecting passions of game players are encouraged and also access to that associated data is increased, making it possible to induce further playing of the game and increase the usage frequency of the game machine.

(3) In this game system, the associated data may comprise game-specific data for the execution of the game.

In this case, the game-specific data corresponds to information on secret tricks to be used in the game and hints relating to the progress of the game, by way of example.

This aspect of the invention can make the game more enjoyable from the game player's point of view. From the game provider's point of view, access to the associated data is increased, making it possible to induce further playing of the game. The increased access broadens the popularity of the game, leading to the development of new game players.

(4) A game machine in accordance with this invention comprises:
  game condition determination means for determining whether or not an operational result of a game player has satisfied a predetermined game condition; and
  means for communicating to the game player access-specific data for accessing associated data that is related to a game and is stored on a device that differs from the game machine, when the game condition has been satisfied.

With this aspect of the invention, the game player can be made to feel a sense of achievement at satisfying a predetermined game condition and can also obtain a deeper understanding of the game by obtaining associated data.

Note that the communication means preferably comprises at least one of means for communicating by display and means for communicating by sound.

(5) In this game machine, the game condition may comprise at least one of a selection condition such that it is necessary for the game player to make a predetermined selection and a result condition such that it is necessary to achieve a predetermined result, together with a time-period condition such that the time at which the game is played must be within a predetermined time-period; and the game condition determination means may comprise:
means for determining at least one of the selection condition such that it is necessary to make a predetermined selection and the result condition such that it is necessary to achieve a predetermined result; and
means for determining the time-period condition.

With this aspect of the invention, the game player can be induced to play the game continuously, by a determination that includes a time-period condition as a game condition. This makes it possible to increase the usage frequency of the game machine and also induce the game player to play the game for a long time without becoming sick of it.

(6) A game data distribution device in accordance with this invention can be accessed from a computer terminal over a network, and this game data distribution device comprises:

storage means for storing associated data of a game; and
means for receiving access-specific data for accessing the associated data of the game sent from the computer terminal, determining whether or not the access-specific data satisfies a predetermined distribution condition, fetching the associated data of the game from the storage means, when the distribution condition has been satisfied, and distributing the associated data of the game to the computer terminal,
wherein the access-specific data is available to a game player when a predetermined game condition has been satisfied.

With this aspect of the invention, the game player can be made to feel a sense of achievement at satisfying a predetermined game condition and can also obtain a deeper understanding of the game by obtaining associated data. This makes it possible to tempt the game player into play the game again.

(7) In this game data distribution device, the game condition may comprise at least one of a selection condition such that it is necessary for the game player to make a predetermined selection and a result condition such that it is necessary to achieve a predetermined result, together with a time-period condition such that the time at which the game is played must be within a predetermined time-period.

With this aspect of the invention, the game player can be induced to play the game continuously, by a determination that includes a time-period condition as a game condition. This also increases the usage frequency of the game machine and also induces the game player to play the game for a long time without becoming sick of it.

(8) In this game data distribution device, the associated data may comprise collectable data which is not related to the execution of the game, but which is related to any of the game story, objects that appear in the game, characters that appear in the game, game images, and game sounds.

In this case, collectable data corresponds to design image data for game characters, icons depicting game characters, or sound data relating to the game, by way of example.

This aspect of the invention makes it possible to satisfy the game player's passion for collecting. From the game provider's side, the collecting passions of game players are encouraged and also access to that associated data is increased, making it possible to induce further playing of the game.

(9) In this game data distribution device, the associated data may comprise game-specific data for the execution of the game.

In this case, the game-specific data corresponds to information on secret tricks to be used in the game and hints relating to the progress of the game, by way of example.

This aspect of the invention can make the game more enjoyable from the game player's point of view. From the game provider's point of view, access to the associated data is increased, making it possible to induce further playing of the game. The increased access also broadens the popularity of the game, leading to the development of new game players.

(10) In an information storage medium in accordance with this invention, information for enabling a game player to play a game is stored, and this information comprises:
information for implementing means for determining whether or not an operational result of the game player satisfies a predetermined game condition;
information for implementing means for communicating to the game player access-specific data for accessing associated data relating to the game, when the game condition has been satisfied; and
information comprising the access-specific data; and
wherein the game condition comprises at least one of a selection condition such that it is necessary for the game player to make a predetermined selection and a result condition such that it is necessary to achieve a predetermined result, together with a time-period condition such that the time at which the game is played must be within a predetermined time-period.

This aspect of the invention can make the game more enjoyable from the game player's point of view. From the game provider's point of view, access to the associated data is increased, making it possible to induce further playing of the game. The increased access also broadens the popularity of the game, leading to the development of new game players.

The game player can be induced to play the game continuously, by a determination that includes a time-period condition as a game condition.

Note that the information for implementing means for communicating preferably comprises at least one of information for implementing means for communicating by display and information for implementing means for communicating by sound.

The access-specific data corresponds to verification data such as password data or location data such as an IP address, by way of example.

(11) According to the present invention, there is also provided a computer-readable information storage medium for use in a situation that enables access from a client device over a network, for storing information for distributing associated data of a game to the client device, wherein the associated data comprises at least one of game-specific data for the execution of the game and collectable data which is not related to the execution of the game, but which is related to any of the game story, objects that appear in the game, characters that appear in the game, game images, and game sounds; and wherein the information comprises:
information comprising the associated data of the game;
information for implementing means for determining whether or not access-specific data satisfies a predetermined distribution condition, where the access-specific data has been transmitted from the client device to enable access to the associated data of the game; and information for implementing means for distributing the associated data of the game to the client device, when the distribution condition has been satisfied.

This aspect of the invention makes it possible to satisfy the game player's passion for collecting. From the game provider's side, the collecting passions of game players are encouraged and also access to that associated data is increased, making it possible to induce further playing of the game.

The increased access also broadens the popularity of the game, leading to the development of new game players.

Note that collectable data in this case corresponds to design image data for game characters, icons depicting game characters, or sound data relating to the game, by way of example.

The game-specific data corresponds to information on secret tricks to be used in the game and hints relating to the progress of the game, by way of example.

BEST MODE FOR CARRYING OUT THE INVENTION

Game systems to which this invention is applied are described below with reference to the accompanying drawings.

First Embodiment

Figure 1:
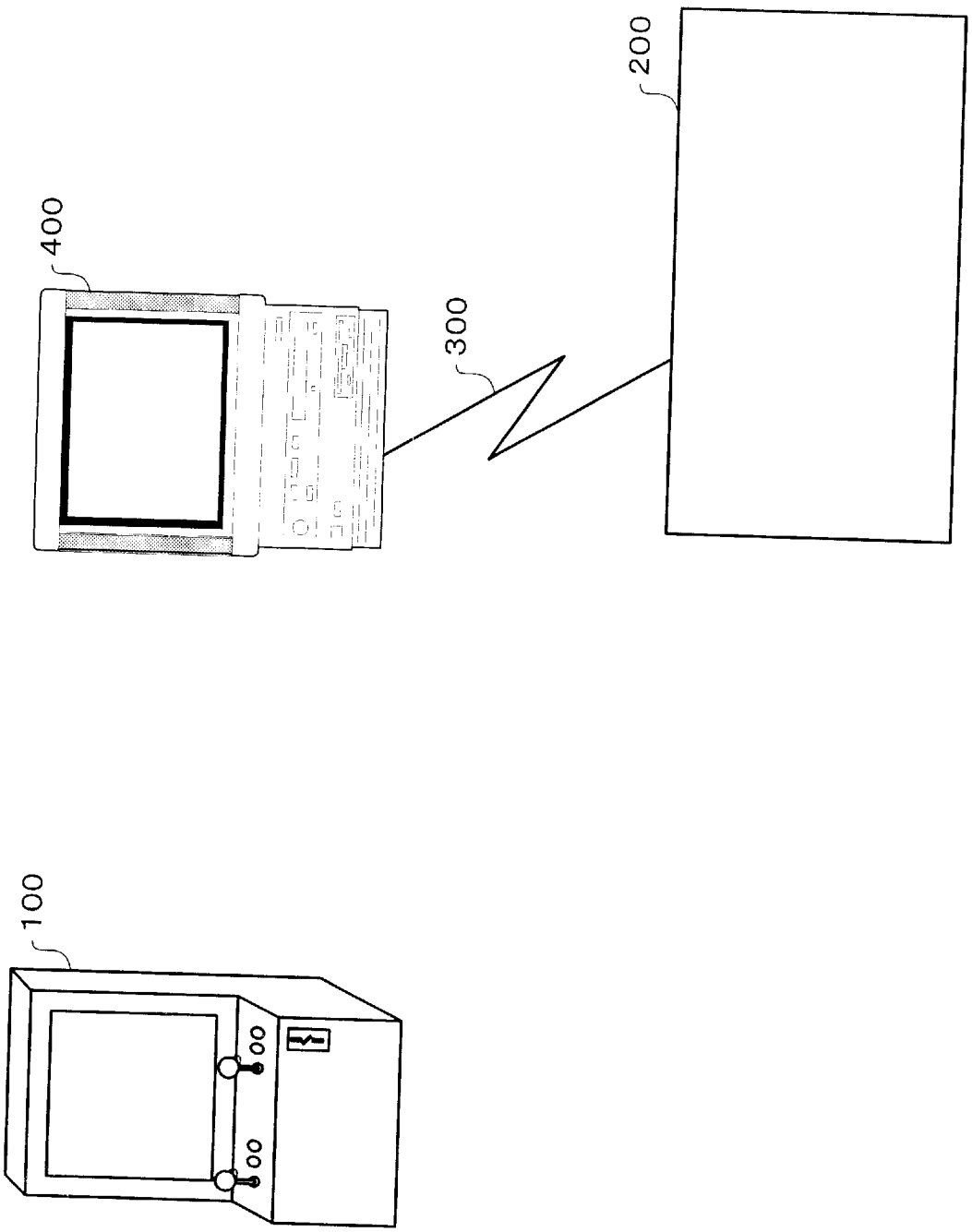
FIG. 1 is a schematic view of an entire game system in accordance with this invention.

An entire game system in accordance with an embodiment of this invention is shown schematically in FIG. 1.

The game system of this embodiment of the invention comprises a game machine 100, on which a game player can play a game, and a game data distribution device 200 for distributing data relating to that game to a computer terminal 400 over a network that comprises a transfer path 300.

The game machine 100 is an arcade game machine installed at a predetermined game site and the computer terminal 400 is a computer installed in a home.

In this game system, the game is performed in the sequence described below. First of all, the game player plays the game at the game machine 100 and obtains data for accessing predetermined associated data by satisfying a predetermined game condition.

The game player uses the access-specific data to access the game data distribution device 200 from the computer terminal 400 over the Internet. This access causes the display of a page relating to the game on the screen of the computer terminal 400. The game player can then download associated data of that game from the displayed page.

In this case, the associated data is data related to the game, including collectable data such as icons of game characters and game-specific data such as information on secret tricks to be used in the game. This data will be described in detail later.

There are various methods of distributing game-associated data in the art, such as a distribution method whereby CD-ROMs are affixed to magazines and a method whereby data is distributed for free from Internet pages.

However, such methods do not induce any passion for collecting associated data because there is little connection between the associated data and the game, and anyone can acquire the associated data.

This embodiment of the invention makes it possible for a game player to play a game on the game machine 100, then obtain access-specific data for accessing predetermined associated data by satisfying a predetermined game condition.

Since this is a fair situation whereby anyone can obtain the associated data, with some exertion, the game player can obtain a large feeling of satisfaction by exertions to meet the game conditions to acquire the associated data.

The game player can perform the above described access and obtain the associated data related to the game without having to purchase a new game machine, by using the computer terminal 400 in an ordinary home.

The game machine 100 that provides the access-specific data and the game data distribution device 200 that provides the associated data will now be described in detail.

Figure 2:
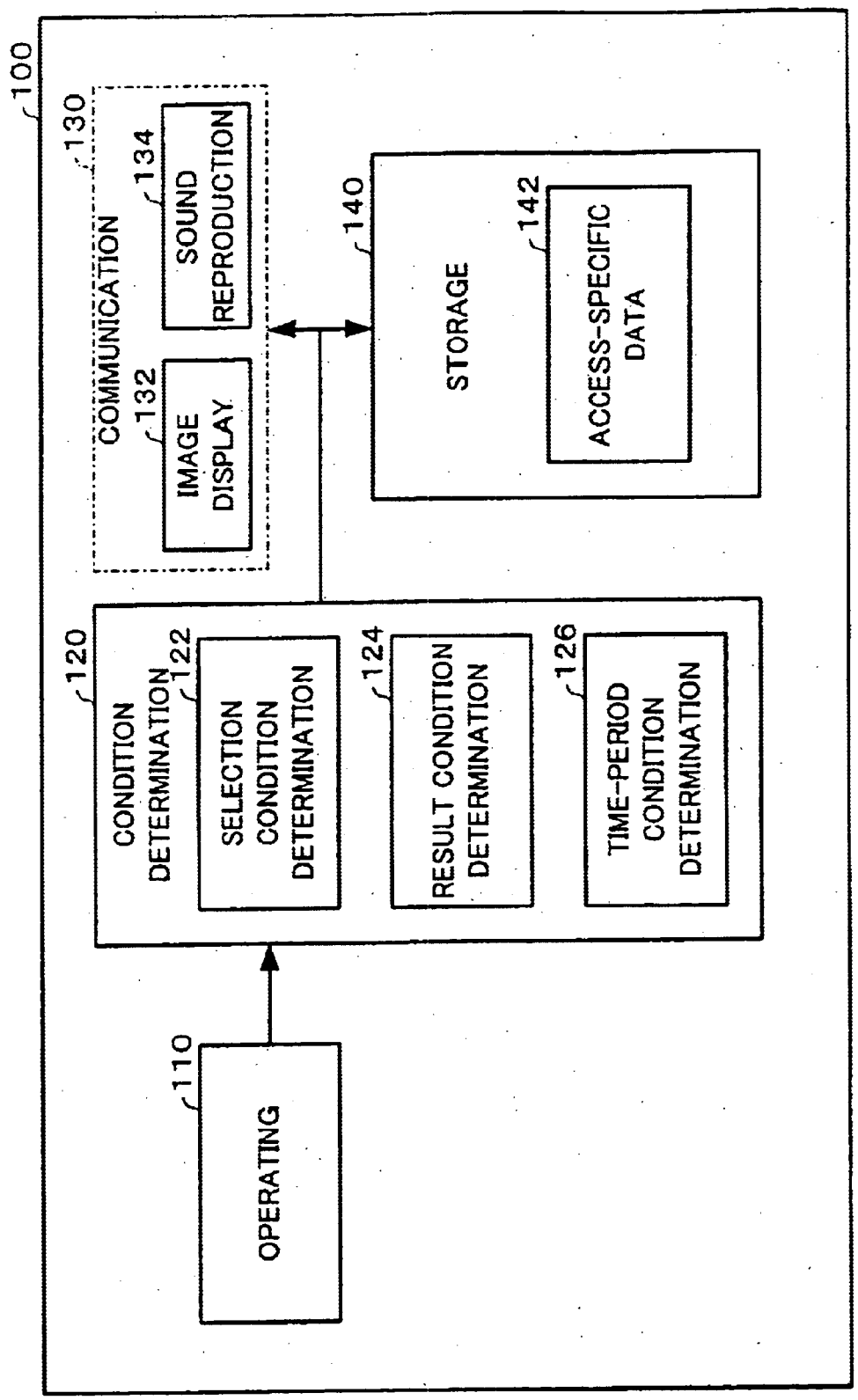
FIG. 2 is a functional block diagram of a game machine in accordance with this invention.

A functional block diagram of the game machine 100 in accordance with this embodiment of the invention is shown in FIG. 2.

The game machine 100 comprises a condition determination section 120 that determines whether or not the result of a game player, who is using an operating section 110 to operate the game, satisfies a predetermined game condition, and a communication section 130 that communicates access-specific data 142 to the game player if the game condition has been satisfied, for accessing associated data.

The game machine 100 comprises a selection condition determination section 122, a result condition determination section 124, and a time-period condition determination section 126 as the condition determination section 120, an image display section 132 and a sound reproduction section 134 as the communication section 130, and also a storage section 140 for storing the access-specific data 142.

In this case, the game conditions comprise at least one of a selection condition such that it is necessary for the game player to make a predetermined selection and a result condition such that it is necessary to achieve a predetermined result, together with a time-period condition such that the time at which the game is played must be within a predetermined time-period.

The selection condition corresponds to the selection of a character to play with or a course to play on, the result condition corresponds to consecutive wins at a combat game or the clearing of a game stage, and the time-period condition corresponds to a time in days such as from July 20th to October 10th, by way of example.

In this manner, the game player can be induced to play the game continuously by adding a time-period condition and changing the associated data that is supplied during each period.

If, for example, the same game conditions are always imposed on the game player by the game machine 100, the game player will think it easy to satisfy the conditions at any time and will lose all desire for playing the game.

In such a case, a game player who has satisfied a game condition once will inevitably lose any desire to play the game again.

If a time-period condition is added, the access-specific data 142 is not communicated without satisfying that time-period condition, even if other conditions are satisfied, increasing the enjoyment of the game and making it possible to induce the player to play the game repeatedly, and thus the game player can be induced to play the game continuously. This increases the usage frequency of the game machine 100, and game players can enjoy the game for longer.

Note that the functions of the condition determination section 120 could be implemented by programming the game conditions and storing them in memory, for example. Otherwise, levers and buttons could be used as the operating section 110, memory could be used as the storage section 140, a display unit could be used as the image display section 132, and speakers could be used as the sound reproduction section 134, by way of example.

The description now turns to the operation of the game machine 100.

Figure 3:
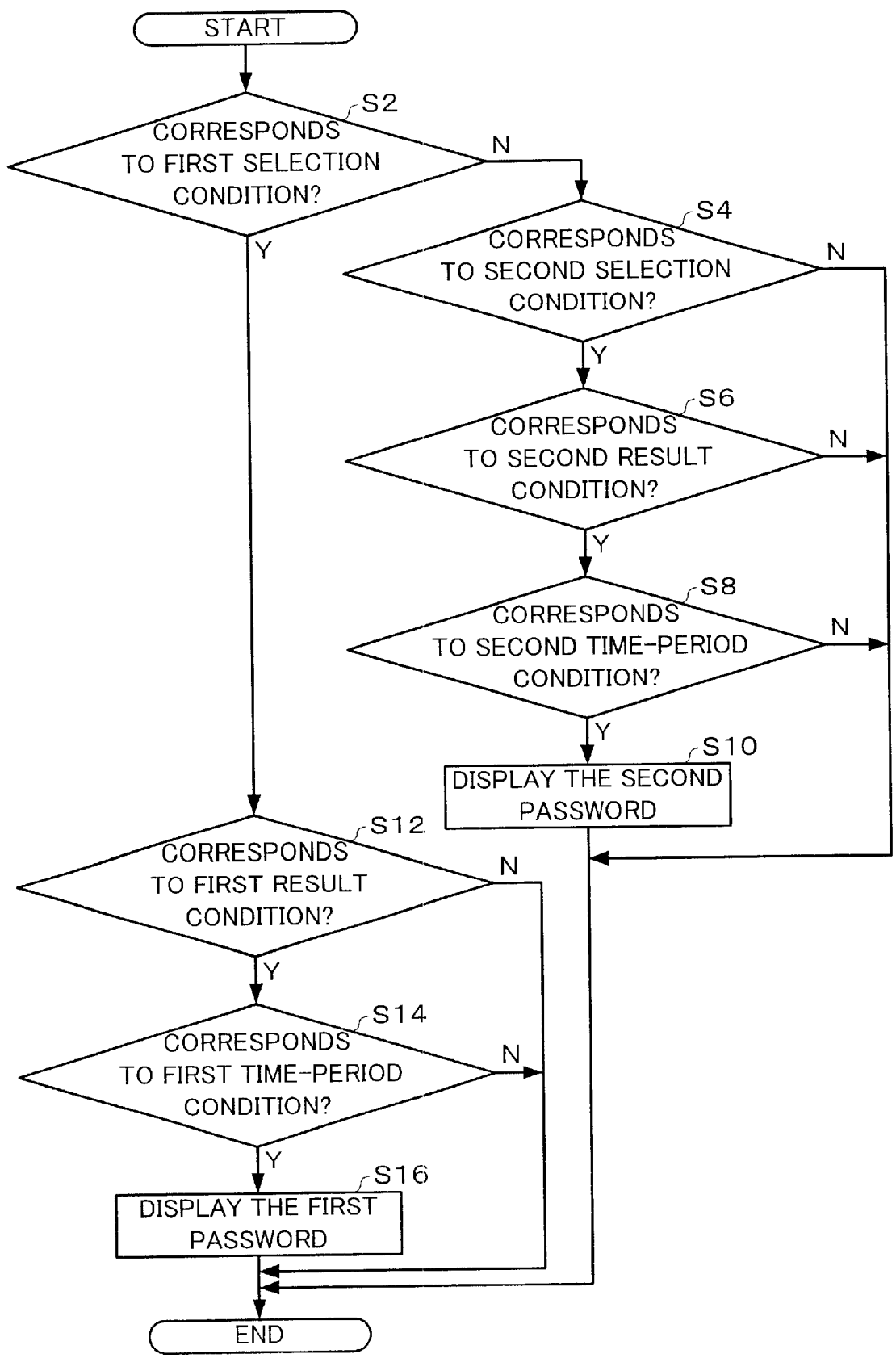
FIG. 3 is a flowchart of the operation of the game machine of FIG. 2.

A flowchart of the operation of the game machine 100 of FIG. 2 is shown in FIG. 3.

If time-period conditions within a plurality of different game conditions form a mutually overlapping time-period, such as what happens when there is a first time-period condition of April 1st to July 31st and a second time-period condition of June 1st to August 31st, it is possible to achieve the effect of a plurality of game conditions within that overlapping time-period (between June 1st and July 31st in this example).

If, for example, there is an overlapping time-period formed by time-period conditions when there are two game conditions wherein a selection condition, result condition, time-period condition are each different, there are effectively two game conditions in that overlapping time-period. The description now turns to an example of the effective presence of two different game conditions.

The sequence is such that the determination first concerns a selection condition relating to which character has been selected, a result condition relating to the clearing of a predetermined game stage, and a time-period condition relating to whether the time at which the game was played was within the valid time-period, based on an operational result of the operating section 110 obtained by a game player on the game machine 100 at a predetermined game site.

Based on the operational result, the selection condition determination section 122 determines whether a first selection condition has been met (step 2).

If the first selection condition has been met, the result condition determination section 124 determines whether a first result condition has been met (step 12).

If the first result condition has been met, the time-period condition determination section 126 determines whether a first time-period condition has been met (step 14).

If all of the above three conditions have been satisfied, the condition determination section 120 fetches the access-specific data 142 from the storage section 140 and transmits it to the communication section 130.

In this case, the access-specific data 142 corresponds to verification data such as passwords or location data such as an IP address, by way of example, but this embodiment of the invention is described below as applied to the use of passwords.

The image display section 132 displays a first transmitted password on the screen (step 16). This makes it possible to use this first password to access associated data that is obtained by the first password.

If even one of the three first game conditions is not satisfied, the first password is not communicated to the game player.

If the selection condition determination section 122 determines that the first selection condition has not been met (step 2), it then determines whether or not a second selection condition has been met (step 4).

If the second selection condition has been met, it is determined by the result condition determination section 124 that a second result condition has been met (step 6), then by the time-period condition determination section 126 that a second time-period condition has been met (step 8).

In a similar manner to the first game condition, a second password is displayed on the image display section 132 by satisfying all of the above three conditions (step 10).

If any one of the above three conditions is not satisfied, the second password is not displayed.

Note that not one password but a plurality of passwords could be communicated simultaneously, making it possible to access a plurality of groups of associated data. If, for example, the word SWORD is to be input as the first password and the word SPIRIT is to be input as the second password during the password input, it is possible to create a game system in which pages can be accessed for the download of associated data by inputting SWORD OF SPIRIT.

In addition, the passwords could be communicated to the game player by the reproduction of sounds by the sound reproduction section 134. It is also possible to communicate the passwords to the game player by printing them onto paper, for example, by a printer section (not shown in the figure). If printing to paper or the like is done, this is more convenient because there is no need for the game player to remember the passwords or write them down.

The configuration is such that a game player can input a password, which is the access-specific data 142 that was obtained as described above, to the computer terminal 400 and thus access the associated data by transmission to the game data distribution device 200.

The game data distribution device 200 will now be described.

Figure 4:
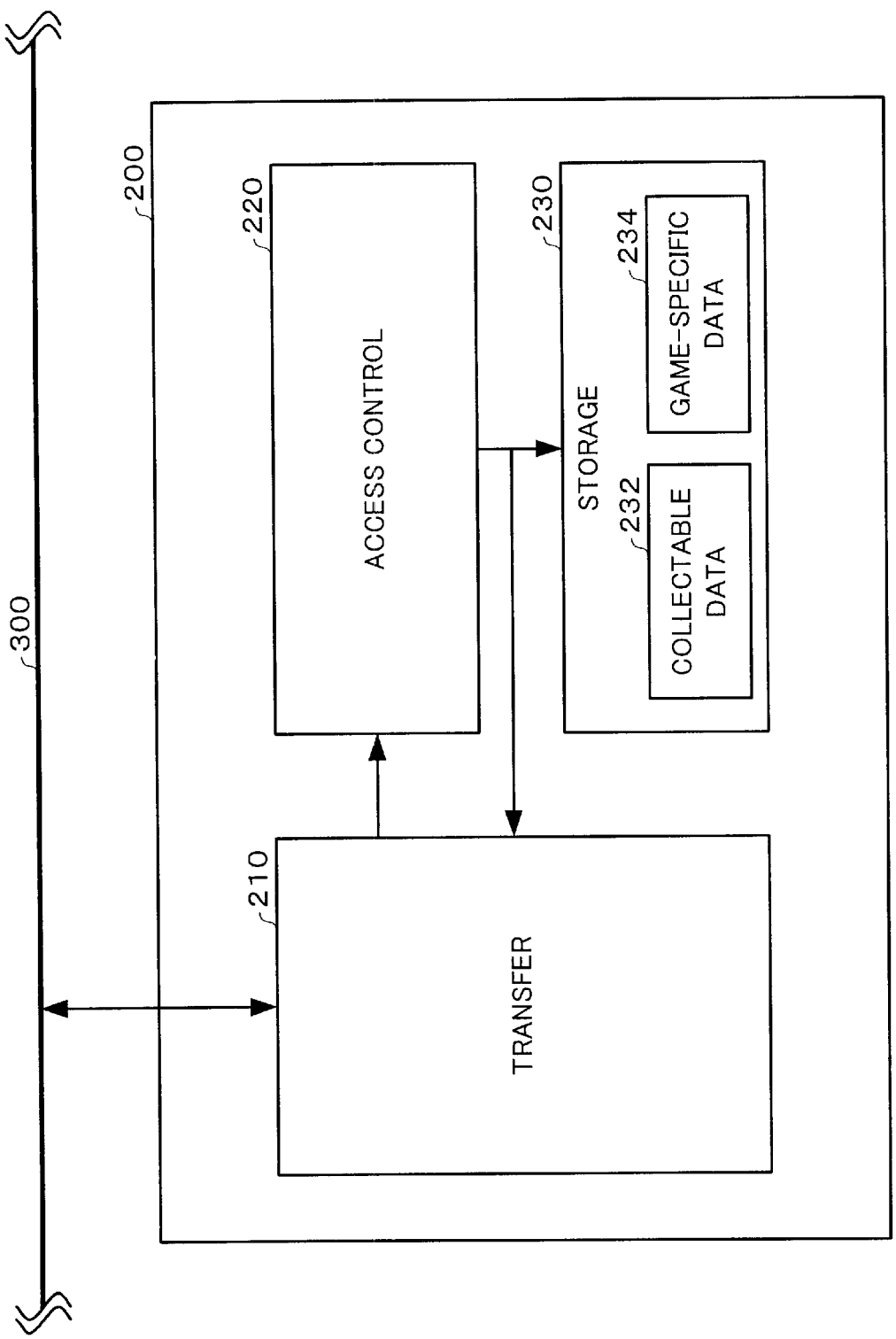
FIG. 4 is a functional block diagram of a game data distribution device in accordance with this invention.

A functional block diagram of the game data distribution device 200 in accordance with this embodiment of the invention is shown in FIG. 4.

The game data distribution device 200 comprises a storage section 230 for storing game-associated data and an access control section 220.

When a transfer section 210 has received the access-specific data 142 from the computer terminal 400 through the transfer path 300, the access control section 220 determines whether or not the access-specific data 142 satisfies a predetermined distribution condition then, if this distribution condition has been satisfied, fetches the associated data from the storage section 230, then distributes it to the computer terminal 400, using the transfer section 210.

Note that communications equipment such as an ATM (asynchronous transfer mode) switch or modem could be employed as the transfer section 210, a CPU could be employed as the access control section 220, and memory or the like could be employed as the storage section 230.

The transfer path 300 is not limited to a wired communications line such as an optical fiber cable; it could also be wireless means such as satellite communications.

The description now turns to the operation of the game data distribution device 200.

Figure 5:
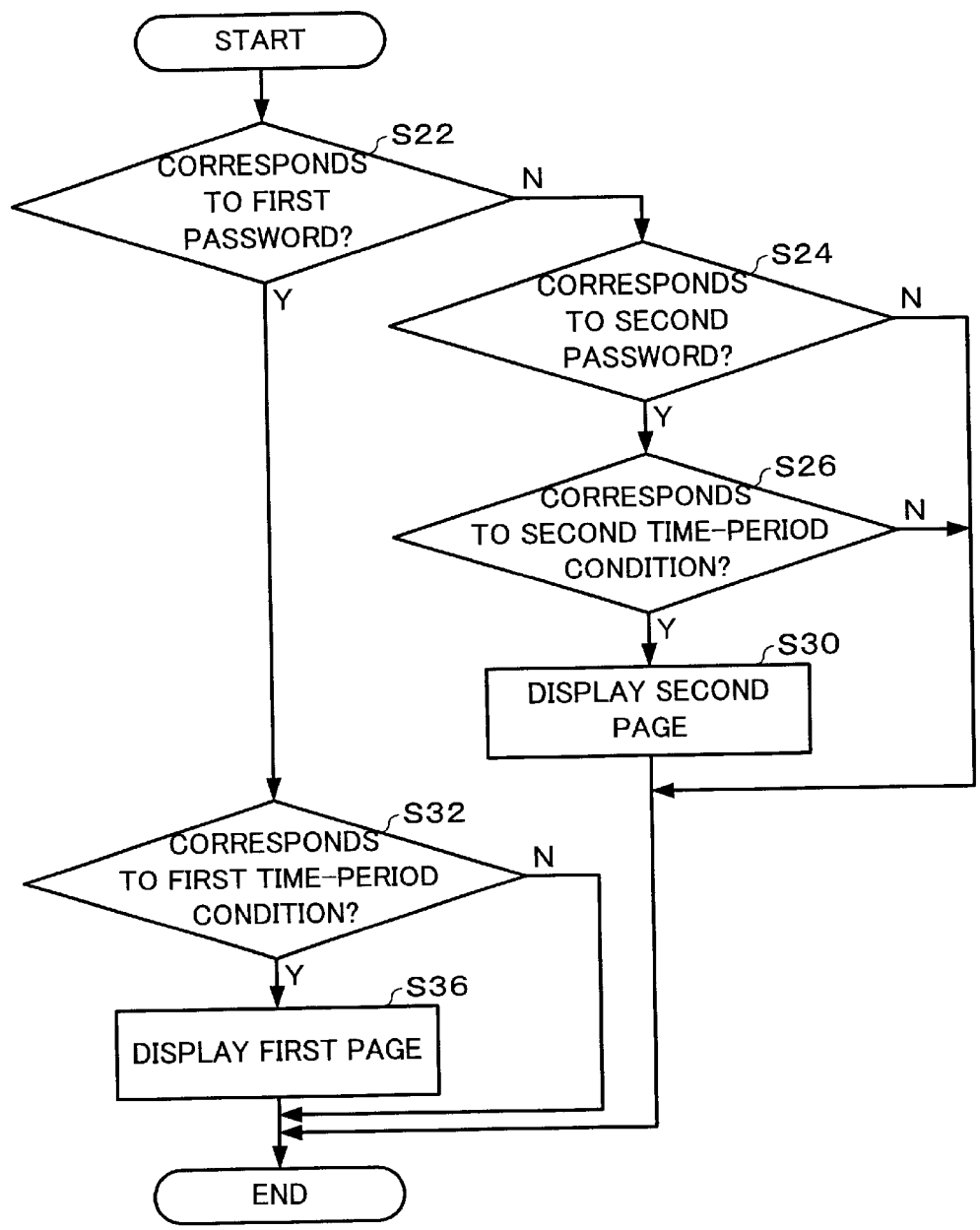
FIG. 5 is a flowchart of the operation of the game data distribution device of FIG. 4.

A flowchart of the operation of the game data distribution device 200 of FIG. 4 is shown in FIG. 5.

First of all, the access control section 220 determines whether the password that has been sent from the computer terminal 400 to the transfer section 210 corresponds to the first password (step 22).

If it does correspond to the first password, the access control section 220 determines whether the first time-period condition has been met (step 32).

Satisfying the above two conditions makes it possible to satisfy the first distribution condition for distributing the first game-associated data, cause the transfer section 210 to distribute to the computer terminal 400 data for displaying a first page, then display the first page on the computer terminal 400 (step 36).

If either one of the above two conditions has not been satisfied, it is not possible to access the first page from the computer terminal 400.

If the sent password is determined by the access control section 220 to not correspond to the first password but correspond to the second password (step 24), the access control section 220 further determines whether the second time-period condition has been met (step 26).

A second distribution condition for the distribution of the second associated data is satisfied by satisfying the above two conditions, and data for displaying a second page is distributed to the computer terminal 400 by the transfer section 210, making it possible to display the second page on the computer terminal 400 (step 30).

In a similar manner to the first distribution condition, if one of the above two conditions is not satisfied, it is not possible to access the second page from the computer terminal 400.

Thus the game player can access these pages to obtain associated data relating to the game.

In this case, collectable data 232 and game-specific data 234 is used as the associated data.

The collectable data 232 is data which is not related to the execution of a game but is related to any of the game story, objects that appear in the game, characters that appear in the game, game images, and game sounds.

More specifically, the collectable data 232 corresponds to data describing the story of the game, fittings of racing cars that appear in the game, personal histories of characters that appear in the game, design image data for characters, icons depicting the characters, so-called "wallpaper"data (background data) such as ending images, and sound data relating to the game, by way of example.

This collectable data 232 is not used during the actual game but is data which was created during the development of the game so that there is no need for the game provider to newly create it and which cannot usually be obtained by game players. For that reason, it stimulates the collecting passions of game players and thus induces the players to play the game again to obtain the collectable data 232.

This makes it possible to satisfy the collecting passions of game players. From the game provider's point of view, this encourages the collecting passions of game players and also increases access to websites where such associated data can be downloaded, making it possible to give game players more interest in playing the game again.

The game-specific data 234 is data relating to the execution of the game. More specifically, the game-specific data 234 corresponds to information such as secret tricks to be used in the game, hints relating to the progress of the game, and the locations of secret items, by way of example.

Providing this game-specific data 234 makes it possible for game players to enjoy the game even more, by enabling them to play the game in a state that is more advantageous than usual, due to the use of secret tricks or the like.

From the game provider's point of view, this also increases access to a website containing such associated data, making it possible to further increase the inducement of game players in playing the game again. In addition, the increase in access to the pages containing the associated data with broaden the popularity of the game, leading to the development of new game players as people hear of it and start playing the game.

The distribution conditions of the game data distribution device 200 could comprise a distribution-specific time-period condition. The distribution-specific time-period condition could be made to be identical with the previously described time-period condition within the game condition.

Creating such a distribution-specific time-period condition forms a clear link between the game on the game machine 100 and game-associated data obtained from pages over the Internet.

In other words, if game players are made clearly aware that associated data for a certain time-period condition can only be obtained by playing the game within that time period, which increases the awareness and enjoyment of game players towards objectives, a passion for collecting associated data is evoked in the game players.

From the game provider's side too, the usage frequency of the game machine 100 can be increased by encouraging this passion for collecting associated data amongst game players, creating an awareness to provide associated data corresponding to each time-period condition and maintaining this associated data so that it is always up-to-date. Ensuring that the pages for downloading associated data are always up-to-date makes it possible to create pages that are fascinating to game players and anyone else who sees those pages, thus increasing the number of accesses to those pages and also increasing the popularity thereof.

Note that the game machine 100 could also be configured in such a manner that the access-specific data 142 is communicated by satisfying either of the previously described selection condition or result condition, with a time-period condition.

In addition, the example described above concerned a case in which two valid game conditions exist simultaneously, but it is also possible to limit the number of valid game conditions to one or to have three or more such conditions.

The game machine 100 created as described above can also be implemented by using an information storage medium. The description now turns to an example of the implementation of the game machine 100 that uses an information storage medium.

Second Embodiment

Figure 6:
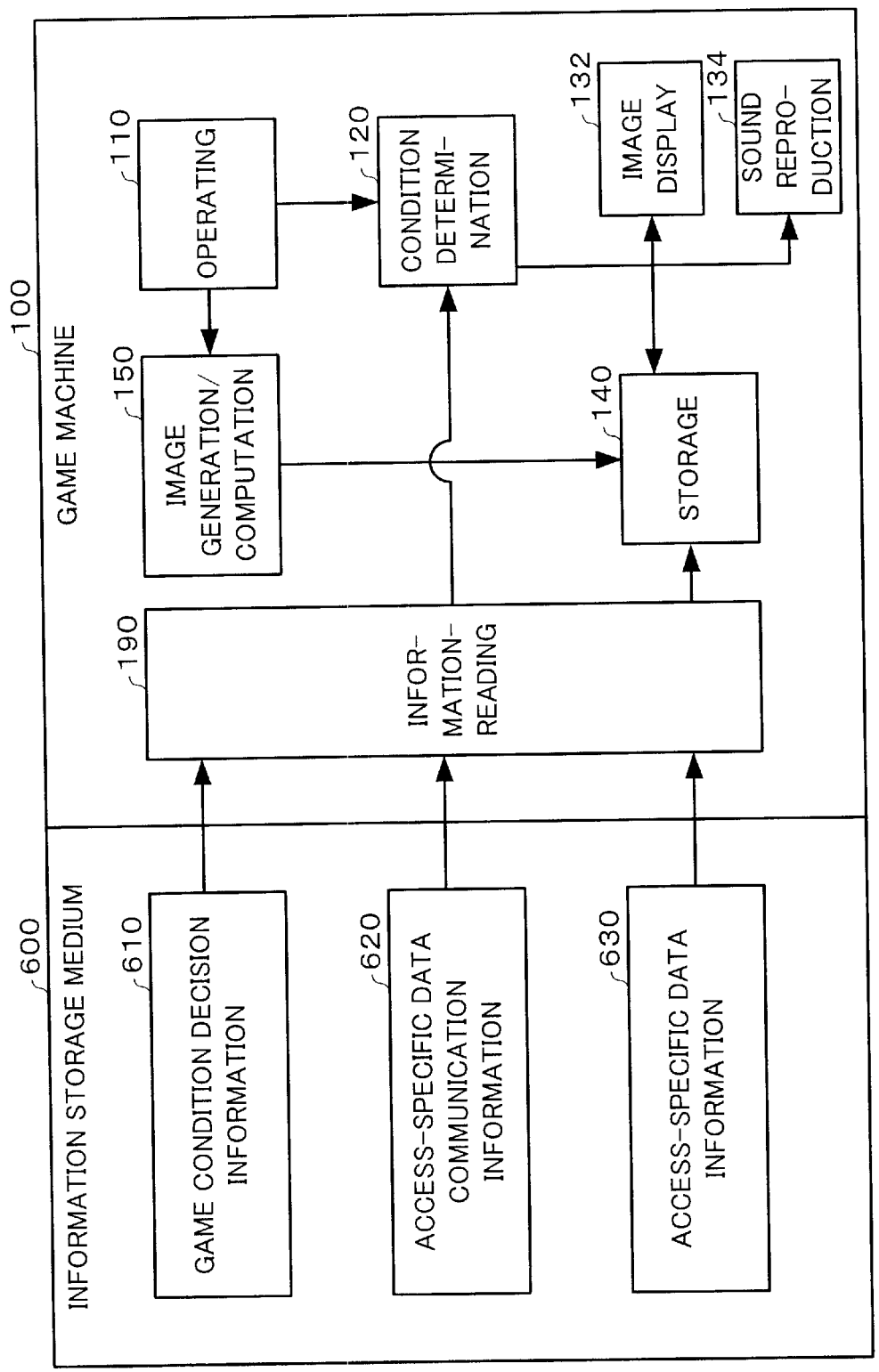
FIG. 6 is a functional block diagram of an information storage medium that contains information for implementing a game machine in accordance with this invention.

A functional block diagram of an information storage medium 600 which stores information for implementing the game machine 100 of the previously described embodiment of this invention is shown in FIG. 6.

The information storage medium 600 is a computer-readable information storage medium 600 in which is stored information for enabling the game player to play the game. In this case, this information comprises game condition decision information 610 for determining whether or not an operational result of a game player satisfies a predetermined game condition, access-specific data communication information 620 for communicating to the game player the access-specific data 142 for accessing associated data relating to the game when the game condition has been satisfied, and access-specific data information 630.

The access-specific data communication information 620 comprises information for implementing means for communicating data by using display.

Note that this information and data can be implemented by a program, a data structure, or objects including a program and data, to give specific examples.

The game condition decision information 610, the access-specific data communication information 620, and the access-specific data information 630 that comprises the access-specific data 142, all stored in the information storage medium 600, is read out by an information-reading section 190 of the game machine 100.

The read-out access-specific data information 630 is stored in the storage section 140 as the access-specific data 142.

When operational results of the operating section 110 are input to the condition determination section 120, the access-specific data 142 is communicated to the game player by the image display section 132, if a predetermined game condition has been satisfied, by using the game condition decision information 610 and the access-specific data communication information 620.

From the game player's point of view, this enables the game player to obtain the access-specific data 142 by playing the game, then obtain associated data related to that game by using the access-specific data 142, thus making the game more enjoyable.

From the game provider's point of view, this makes it possible to increase access to a website that enables the downloading of that associated data, prompting further inducement at playing the game again. The increase in access also increases the popularity, leading to the development of new game players, which increases the usage frequency of the game, and also increases profits.

Note that the game condition in this case is at least one of a selection condition such that it is necessary to make a predetermined selection and a result condition such that it is necessary to achieve a predetermined result, as well as a time-period condition such that it is necessary to be within a predetermined time-period at the point at which the game is played.

In this manner, it is possible to change the access-specific data 142 in accordance with the time at which the game is played by deciding to include a time-period condition within the game condition, thus making it possible to induce game players to keep on playing the game.

Note that the game machine 100 uses an image generation/computation section 150 to generate ordinary game images and perform game computations.

The description now turns to an embodiment that uses an information storage medium to implement the game data distribution device 200 that was described with reference to the first embodiment.

Third Embodiment

Figure 7:
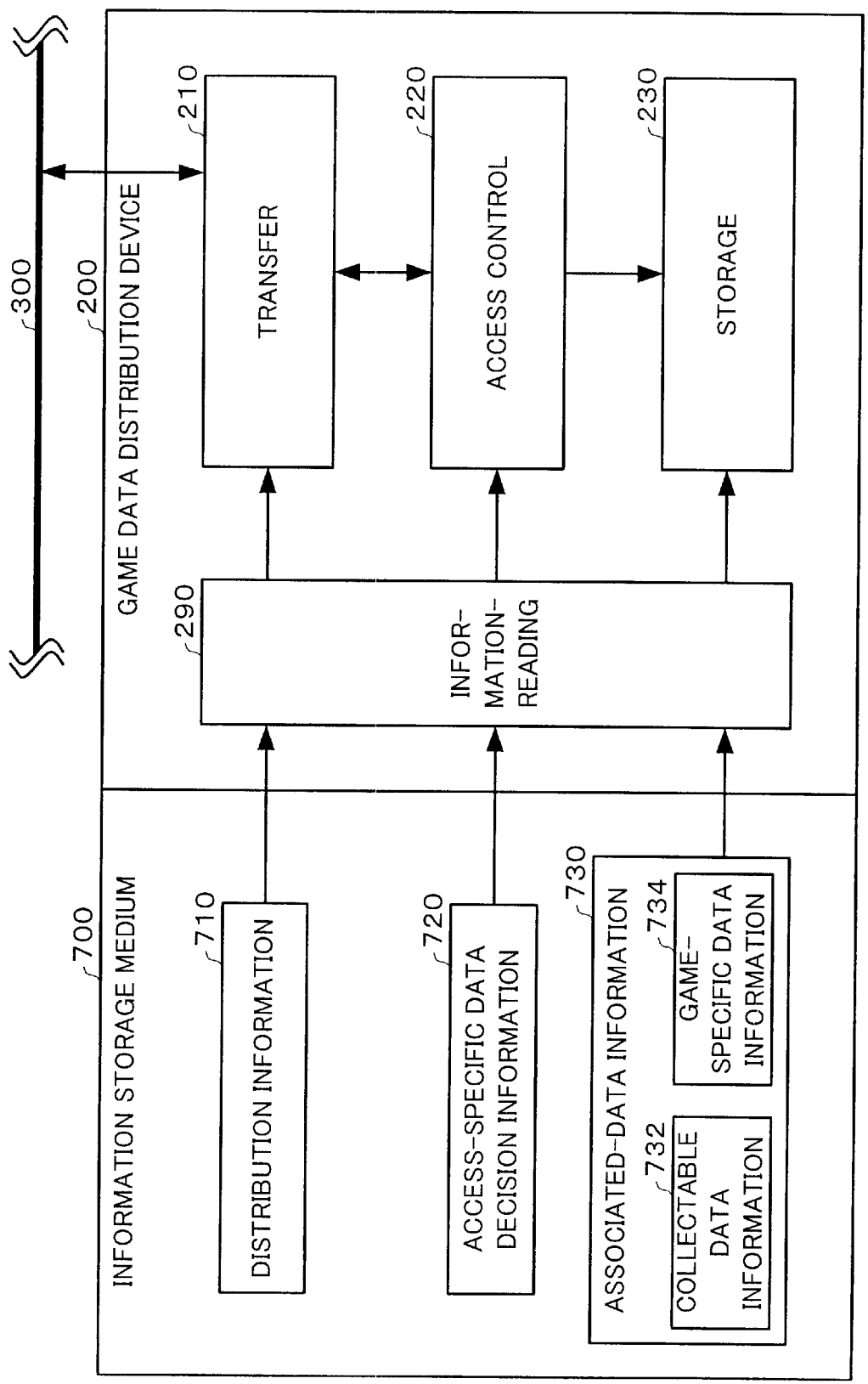
FIG. 7 is a functional block diagram of an information storage medium that contains information for implementing a game data distribution device in accordance with this invention.

A functional block diagram of an information storage medium 700 which stores information for implementing the game data distribution device 200 of this embodiment of the invention is shown in FIG. 7.

The information storage medium 700 is a computer-readable information storage medium 700 in which is stored information for implementing means for distributing associated data of a game to the computer terminal 400, in a situation wherein access is from the computer terminal 400, which is a client device, over a network that comprises the transfer path 300.

This information comprises information 730 that comprises game-associated data, information 720 for implementing means for determining whether or not the access-specific data satisfies a predetermined distribution condition, and information 710 for implementing means for distributing the associated data to the computer terminal 400 if the access-specific data does satisfy the distribution condition.

In this case, the associated-data information 730 comprises collectable-data information 732 including collectable data which is not related to the execution of a game, but which is related to any of the game story, objects that appear in the game, characters that appear in the game, game images, and game sounds and game-specific data information 734 including game-specific data for the execution of the game.

Note that this information can be implemented by a program, a data structure, or objects including a program and data, to give specific examples.

The distribution information 710, the access-specific data decision information 720, and the associated-data information 730 stored in the information storage medium 700 is read out by an information-reading section 290 of the game data distribution device 200.

This causes the collectable data 232 and the game-specific data 234 to be stored in the storage section 230.

The access control section 220 determines whether or not the access-specific data 142 sent from the computer terminal 400 satisfies the distribution condition and, if the distribution condition is satisfied, the predetermined game-associated data in the storage section 230 is distributed to the computer terminal 400.

If this is done, the associated data that is the collectable data 232 and the game-specific data 234 can be obtained by the game player, satisfying the game player's passion for collecting.

From the game provider's side, the collecting passions of game players are encouraged and also access to that associated data is increased, making it possible to tempt the game player into play the game again.

The increased access broadens the popularity of the game and attracts people who have not played the game before, leading to the development of new game players.

Note that it is possible to not only use an external information storage medium such as a CD-ROM, game cassette, or DVD RAM as the information storage medium 600 or 700 described in the second or third embodiment of this invention, but also an internal information storage medium such as a hard disk or memory such as ROM or RAM.

In addition, the information stored in the information storage medium 600 or 700 could be embodied in a carrier wave. In other words, it is possible to implement the previously described functions by downloading information that is stored on a server device to the game machine through the transfer path 300, without connecting the information storage medium 600 or 700 directly to the information-reading section 190 or 290.

The information-reading section 190 or 290 could be something that reads data therefrom magnetically or by a laser beam, or an input-output port or the like that reads signals, by way of example, depending on the type of information storage medium. The rest of the hardware is similar to that described previously.

Although preferred embodiments of the application of this invention have been described above, applications of the present invention are not limited to these embodiments.

For example, the game machine 100 was described above as an independent game machine, but the game machine could equally well be of a form that is connected to a network.

In addition, the game machine 100 could be a domestic game machine or it could equally well be an arcade game machine.

With a domestic game machine, the previously described computer terminal 400 could be integrated with the game machine, making it possible to connect the domestic game machine to the Internet instead of the computer terminal 400 and obtain associated data by inputting access-specific data from the domestic game machine.

With an arcade game machine, the arcade game machine at the game site could be connected to the Internet, making it possible to obtain associated data by inputting access-specific data from the arcade game machine instead of the computer terminal 400.

It is not necessary that the previously described associated data comprises both the collectable data and the game-specific data; it could equally well comprise just one type of data.

In addition, it is not necessary that the previously described means of communicating access-specific data to the game players always uses both sounds and images; communicating could equally well be done by using only one.

What is claimed is:

1. A game system comprising a game machine and a game data distribution device for distributing associated data of a game to a computer terminal over a network,
   wherein said game machine comprises:
      means for determining whether or not an operational result of a game player at the game machine has satisfied a predetermined game condition on the basis of game condition data which indicates the game condition; and
      means for communicating to the game player access-specific data for accessing said associated data of the game, when said game condition has been satisfied,
      wherein said game condition comprises at least one of a selection condition such that it is necessary for the game player to make a predetermined selection in the game and a result condition such that it is necessary to achieve a predetermined result in the game, together with a time-period condition such that the time at which the game is played must be within a predetermined time-period; and
   wherein said game data distribution device comprises:
      storage means for storing said associated data of the game; and
      means for determining whether or not said access-specific data satisfies a predetermined distribution condition, when said access-specific data has been received from said computer terminal, and fetching said associated data of the game from said storage means when said distribution condition has been satisfied, for distribution to said computer terminal,
      said associated data comprising collectable data which is not related to the execution of the game, but which is related to any of the game story, objects that appear in game, characters that appear in game, game images and game sounds.

2. The game system as defined in claim 1,
   wherein said associated data comprises game-specific data for the execution of the game.

3. The game system as defined in claim 1,
   said game condition, said time-period condition, and said distribution condition include several kinds of conditions,
   and said means for communicating communicates to the game player different access-specific data depending on satisfied game condition,
   and said means for determining and fetching fetches different said associated data of the game depending on satisfied distribution condition.

4. A game machine comprising:
   game condition determination means for determining whether or not an operational result of a game player at the game machine has satisfied a predetermined game condition on the basis of game condition data which indicates the game condition; and
   means for communication to the game player access-specific data for accessing associated data that is related to a game and is stored on a device that differs from said game machine over a network, when said game condition has been satisfied,
   wherein said game condition comprises at least one of a selection condition such that it is necessary for the player to make a predetermined selection in the game and a result condition such that it is necessary to achieve a predetermined result in the game, together with a time-period condition such that the time at which the game is played must be within a predetermined time period; and
   wherein said game condition determining means comprises:
      means for determining at least one of said selection condition such that it is necessary to make a predetermined selection and said result condition such that it is necessary to achieve a predetermined result; and
      means for determining said time-period condition,
      said associated data comprising collectable data which is not related to the execution of the game, but which is related to any of the game story, objects that appear in game, characters that appear in game, game images and game sounds.

5. The game machine as defined in claim 4,
   said game condition and said time-period condition include several kinds of conditions,
   and said means for communicating communicates to the game player different access-specific data depending on satisfied game condition.

6. A game data distribution device that can be accessed from a computer terminal over a network, said game data distribution device comprising:

storage means for storing associated data of a game; and means for receiving access-specific data for accessing said associated data of the game sent from said computer terminal, determining whether or not said access-specific data satisfies a predetermined distribution condition, fetching said associated data of the game from said storage means, when said distribution condition has been satisfied, and distributing said associated data of the game to said computer terminal, wherein said access-specific data is available to a game player when a predetermined game condition has been satisfied in the game, wherein said game condition comprises at least one of a selection condition such that it is necessary for the player to make a predetermined selection in the game and a result condition such that it is necessary to achieve a predetermined result in the game, together with a time-period condition such that the time at which the game is played must be within a predetermined time period, said associated data comprising collectable data which is not related to the execution of the game, but which is related to any of the game story, objects that appear in game, characters that appear in game, game images and game sounds.

7. The game data distribution device as define in claim 6, wherein said associated data comprises game-specific data for execution of the game.

8. The game data distribution device as defined in claim 6, said game condition, said time-period condition, and said distribution condition include several kinds of conditions, and said access-specific data are different depending on satisfied game condition, and said means for distributing distributes to said computer terminal different said associated data of the game depending on satisfied distribution condition.

9. Computer-usable information embodied on an information storage medium or in a carrier wave, for enabling a game player to play a game, said computer-usable information comprising:

information for implementing means for determining whether or not an operational result of the game player at a game machine has satisfied a predetermined game condition on the basis of game condition data which indicates the game condition;

information for implementing means for communicating to the game player access-specific data for accessing associated data related to the game over a network, when said game condition has been satisfied; and information comprising said access-specific data;

wherein said game condition comprises at least one of a selection condition such that it is necessary for the player to make a predetermined selection in the game and a result condition such that it is necessary to achieve a predetermined result in the game, together with a time-period condition such that the time at which the game is played must be within a predetermined time period, said associated data comprising collectable data which is not related to the execution of the game, but which is related to any of the game story, objects that appear in game, characters that appear in game, game images and game sounds.

10. The computer-usable information as defined in claim 9, said game condition and said time-period condition include several kinds of conditions, and said means for communicating communicates to the game player different access-specific data depending on satisfied game condition.

11. Computer-usable information embodied on an information storage medium or in a carrier wave, for use in a situation that enables access from a client device over a network, for distributing associated data of a game to said client device, wherein said associated data comprises at least one of game-specific data for the execution of the game and collectable data which is not related to the execution of the game, but which is related to any of the game story, objects that appear in the game, characters that appear in the game, game images, and game sounds; and wherein said computer-usable information comprises:

information comprising said associated data of the game;

information for implementing means for determining whether or not access-specific data satisfies a predetermined distribution condition, where said access-specific data has been transmitted from said client device to enable access to said associated data of the game; and information for implementing means for distributing said associated data of the game to said client device, when said distribution condition has been satisfied, wherein said access-specific data is available to a game player when a predetermined game condition has been satisfied in the game, wherein said game condition comprises at least one of a selection condition such that it is necessary for the player to make a predetermined selection in the game and a result condition such that it is necessary to achieve a predetermined result in the game, together with a time-period condition such that the time at which the game is played must be within a predetermined time period.

12. The computer-usable information as defined in claim 11, said game condition, said time-period condition, and said distribution condition include several kinds of conditions, and said access-specific data are different depending on satisfied game condition, and said means for distributing distributes to said computer terminal different said associated data of the game depending on satisfied distribution condition.

* * * * *